UNITED STATES PATENT OFFICE.

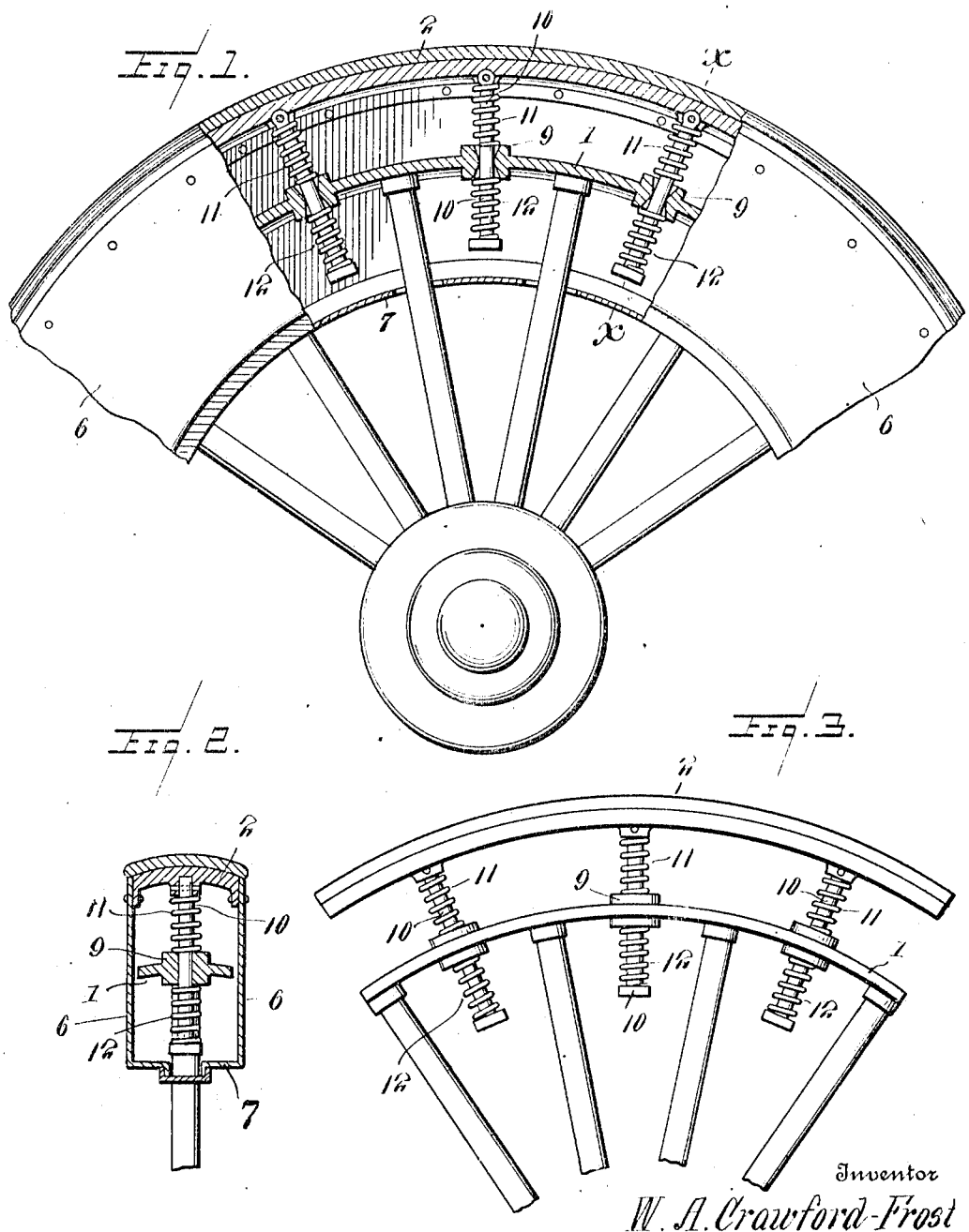

WILLIAM A. CRAWFORD-FROST, OF BALTIMORE, MARYLAND.

SPRING-WHEEL.

1,072,433.   Specification of Letters Patent.   Patented Sept. 9, 1913.

Application filed October 27, 1911. Serial No. 657,016.

*To all whom it may concern:*

Be it known that I, WILLIAM A. CRAWFORD-FROST, a citizen of the United States, residing at Windsor Hills, Baltimore, State of Maryland, have invented new and useful Improvements in Spring-Wheels, of which the following is a specification.

The primary purpose of the present invention is the provision of a wheel intended chiefly for automobiles and kindred machines adapted to be mechanically driven and has for its object to supply a wheel having a yieldable tread which will possess all the qualities of a pneumatic tire with the advantages of a solid tire.

The invention comprises a wheel having concentric rims which are spaced apart and between which are arranged cushioning devices, the spaces between the rims being closed at their sides by means of guards to prevent foreign matter, such as mud, dust, water and the like, interfering with the cushioning devices and the interposed connections between the rims.

Broadly considered the invention provides a construction which enables a modified use in the capacity of a buffer for relieving the impact incident to the stoppage of bodies when in motion. The construction is such that when the invention is adapted for use as a buffer it may be applied to automobiles, water-craft, locomotive engines, cars or the like so as to relieve the shock when the impact occurs.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a side view, parts broken away, of a spring wheel embodying the invention. Fig. 2 is a cross section on the line $x$—$x$ of Fig. 1. Fig. 3 is a view showing the invention adapted for use as a buffer.

Corresponding and like parts are referred to in the following description, and indicated in all the views of the drawings, by the same reference characters.

The wheel proper may be of any construction such as commonly provided for vehicles. The tire consists of an inner rim 1 and an outer rim 2 between which are interposed guide and cushioning devices. The inner rim 1 may consist of the felly or rim proper of the wheel and may be of any form in cross section. The outer rim 2 is spaced from the inner rim and may likewise be of any form in transverse section. It is to be understood that the tread portion of the outer rim or tire may be of any form according to the result to be attained. The rims 1 and 2 are transversely curved, the convex sides facing outward. Rods 10 are secured in any manner to the outer rim 2 and pass loosely through openings formed in the inner rim 1. These rods 10 serve as guides to direct the outer rim in its movements and to retain it in proper position. Two sets of rods 3 are provided and are located upon opposite sides of a medial line. The inner ends of the rods 3 have stops 4 which may consist of nuts mounted upon threaded portions of the rods. Helical springs 11 are mounted upon the rods 10 between the inner and outer rims. These springs constitute the cushioning devices which sustain the load, said springs being of helical form and expansible so as to exert an outward pressure upon the rim 2. Guards 6 close the sides of the space formed between the inner and the outer rims. The guards 6 are of annular form and their outer edge portions conform to side portions of the rim 2 and are rigidly connected thereto in any manner. The inner edges of the guards or rings 6 are bent inwardly, as indicated at 7. The guards 6 may be riveted to the rim 2.

The rim 1 has bosses 9 in line with the openings through which the guide rods 10 pass, said bosses projecting inwardly and outwardly from the rim and having the openings outwardly flared from a middle point. The guide rods 10 are located in the plane of the spokes of the wheel, thereby enabling single rods being employed. Springs 11 and 12 are mounted upon the guide rods 10 and are arranged upon opposite sides of the rim 1, the springs 11 being exterior to the rim 1 and between said rim and the outer rim 2, whereas the springs 12 are located upon the inner side of the rim 1 and between said rim and the hub of the wheel. The springs 11 sustain the load or impact, whereas the springs 12 compensate for the rebound. The springs 11 and 12 are of helical form and expansible.

The guide rods 10 are connected at their outer ends to the rim 2 in any manner to provide for a limited movement of the rim 2 as well as to prevent binding between the guide rods and the rim 1. The rods 10 have an oscillatory movement in the bosses 9 in addition to a radial movement, hence the outward flare of the openings in the bosses. While the openings flare in the plane of the wheel they are of uniform width so as to prevent any lateral play of the guide rods.

The guards or rings 6 are secured at their outer edges to the rim 2 in any manner.

In the modification shown in Fig. 3 the invention is illustrated as adapted to a structure capable of use as a buffer for relieving the shock incident to the stoppage of moving bodies, such as vehicles, water-craft, or rolling railway stock. The rims 1 and 2 are formed on arcs of circles and may consist of curved supports, the part 2 sustaining the impact and the part 1 receiving the thrust of the shock absorbing springs 11 and 12 which are mounted upon the guide rods 10.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A cushioning device comprising inner and outer spaced rims, the inner rim having openings and formed with bosses in line with the openings, said bosses projecting from opposite sides of the rim and having openings therein outwardly flared from a middle point in the plane of the rim, rods having pivotal connection with the outer rim and passing loosely through the openings of the said bosses, and expansible helical springs mounted upon the rods on opposite sides of the inner rim.

In testimony whereof I affix my signature in presence of two witnesses.

WILLIAM A. CRAWFORD-FROST.

Witnesses:
  GEORGE W. MANLEY,
  WILLIAM E. SCHUL.